United States Patent [19]
Dettman et al.

[11] Patent Number: 5,879,277
[45] Date of Patent: Mar. 9, 1999

[54] TOOL STORAGE AND RETRIEVAL SYSTEM

[75] Inventors: Mark Prentiss Dettman, Wixon; Michael John Harris, Grand Blanc, both of Mich.

[73] Assignee: Kawasaki Robotics (USA) Inc., Wixon, Mich.

[21] Appl. No.: 873,387

[22] Filed: Jun. 11, 1997

[51] Int. Cl.⁶ .................................................. B23Q 3/155
[52] U.S. Cl. ................................ 483/13; 483/9; 483/59; 483/901; 901/41
[58] Field of Search .................................. 487/59, 28, 9, 487/902, 901, 13, 56, 55, 54; 409/230; 901/41, 39; 364/474.21; 219/86.8; 211/1.51, 70.6

[56] References Cited

U.S. PATENT DOCUMENTS

| | | | |
|---|---|---|---|
| 3,249,997 | 5/1966 | Hutchens | 483/9 |
| 3,587,165 | 6/1971 | Griffith | 483/9 |
| 3,775,837 | 12/1973 | Tomita et al. | 483/59 X |
| 4,486,928 | 12/1984 | Tucker . | |
| 4,637,121 | 1/1987 | Wortmann | 483/28 X |
| 4,706,372 | 11/1987 | Ferrero . | |
| 4,773,815 | 9/1988 | Lemelson . | |
| 4,850,099 | 7/1989 | Scollard . | |
| 4,883,939 | 11/1989 | Sagi . | |
| 4,913,617 | 4/1990 | Nicholson . | |
| 5,017,084 | 5/1991 | Lemelson . | |
| 5,044,063 | 9/1991 | Voellmer | 403/59 |
| 5,256,128 | 10/1993 | Neumann | 483/59 X |
| 5,372,567 | 12/1994 | Whittington et al. | 483/59 X |
| 5,702,336 | 12/1997 | Kameyama | 483/56 |

FOREIGN PATENT DOCUMENTS

| | | | |
|---|---|---|---|
| 277169 | 3/1990 | German Dem. Rep. | 483/8 |
| 3830488 | 3/1990 | Germany | 483/9 |
| 3843519 | 7/1990 | Germany | 483/59 |
| 10735 | 1/1991 | Japan | 483/59 |

*Primary Examiner*—William Briggs
*Attorney, Agent, or Firm*—Oppenheimer Wolff & Donnelly LLP

[57] ABSTRACT

The present invention relates to a versatile apparatus for securely storing and retrieving a variety of tools. A tool holding rack according to the present invention has a plurality of tool-holding clamping units. The tool-holding clamping units are mounted in a horizontal array, and a robot arm can access the units from below for retrieving and storing tools on the units. Consequently, the rack can be mounted above a work area, thereby increasing the working space available on the work area for manufacturing operations. In one embodiment of the present invention, each tool holding unit has a first jaw and a second jaw, with at least the second jaw being open at the bottom. The second jaw is movable relative to the first jaw. The tool-holding clamping units have a clamped mode in which the unit is adapted to clamp a tool in place on the rack, and an open mode in which the first jaw is spaced from the second jaw such that the unit is adapted to permit removal of a tool from the rack.

27 Claims, 7 Drawing Sheets

TOOL STORAGE AND RETRIEVAL SYSTEM

I. BACKGROUND OF THE INVENTION

1. Field of the Invention

The present invention relates to tool racks for use in conjunction with robotic arms, and specifically to a tool rack that is mounted off of the floor so as to maximize available floor space.

2. Description of Related Art

Manufacturing companies use robotic arms to perform a variety of tasks. In metal stamping operations, for example, a robotic arm can be employed to perform a sequence of tasks, each requiring the arm to use a particular tool. The tools can be quite heavy, typically in the 200–300 pound range, and the robotic arm must rapidly store and retrieve the tools to facilitate high volume production.

The tools must be stored in some organized fashion, so that the robotic arm can retrieve and replace tools as necessary. One approach to storing tools is disclosed in U.S. Pat. No. 4,706,372, which relates to storing and exchanging measuring tools. The system of the '372 patent utilizes a tool rack that sits on the work floor. Consequently, the device takes up valuable floor space that could otherwise be used for manufacturing operations. Furthermore, the rack is designed merely to hold lightweight measuring tools and must be oriented vertically. Because the orientation of the rack is only vertical, a robotic arm must grasp the tool from the side of the rack, even if it would be more efficient to grasp the tool from above or beneath in a particular operation.

U.S Pat. No. 4,486,298 discloses another tool storage apparatus from which a robotic arm stores and retrieves small, lightweight tools. The robotic arm inserts the tools into openings formed at each of the storage locations. The robotic arm twists the tools in one direction to lock them into place on the storage apparatus, then twists them in the opposite direction at a later time to unlock them. Unfortunately, like the device of the '372 patent, the apparatus of the '298 patent sits on the work surface where the robotic arm is performing the manufacturing steps. Consequently, valuable work space is lost in storing the tools.

II. SUMMARY OF THE INVENTION

The present invention relates to a versatile apparatus for securely storing and retrieving a variety of tools. A tool holding rack according to the present invention has a plurality of tool-holding clamping units. The tool-holding clamping units are mounted in a horizontal array, and a robot arm can access the units from below for retrieving and storing tools on the units. Consequently, the rack can be mounted above a work area, thereby increasing the working space available on the work area for manufacturing operations.

In one embodiment of the present invention, each tool holding unit has a clamp with a first jaw and a second jaw, with at least the second jaw being open at the bottom. The second jaw is movable relative to the first jaw. The tool-holding units have a clamped mode in which the unit is adapted to clamp a tool in place on the rack, and an open mode in which the first jaw is spaced from the second jaw such that the unit is adapted to permit removal of a tool from the rack.

Considering one particular embodiment in some detail, a rack is provided for storing and retrieving tools for a robotic arm. The tools each have a tool disk and at least one tool pin aperture. The rack has a first jaw and a second jaw, with at least the second jaw being open at the bottom. The rack has at least one rod, with the second jaw being movable along the rod relative to the first jaw. A drive mechanism is connected to the second jaw and is adapted to move said second jaw relative to said first jaw along the rod, between an open position and a clamped position. The drive is preferably a pneumatic drive, but may alternatively be a hydraulic drive, a motor-driven drive or a magnetic drive, or other type of drive known in the art.

One or more tool pins extend from the first jaw toward the second jaw. The tool pin is adapted to extend through a tool pin aperture of one of the tools when the tool is mounted on the rack unit, thereby supporting the tool. The rack has a position detector that detects when a tool is mounted on the rack unit. The rack also has at least one detector for determining whether the rack unit is open or shut.

The rack unit has a clamped position for storing a tool on the rack unit in which the second jaw is relatively closer to the first jaw. The rack also has an open position for both mounting and removing a tool from the rack unit in which the second jaw is relatively farther from the first jaw. The rack can be biased so that it naturally tends toward the clamped position.

Other objects, features and advantages of the invention will become apparent from a consideration of the following detailed description and from the accompanying drawings.

III. BRIEF DESCRIPTION OF THE DRAWINGS

IV. DETAILED DESCRIPTION OF THE PREFERRED EMBODIMENT

Figure 1:
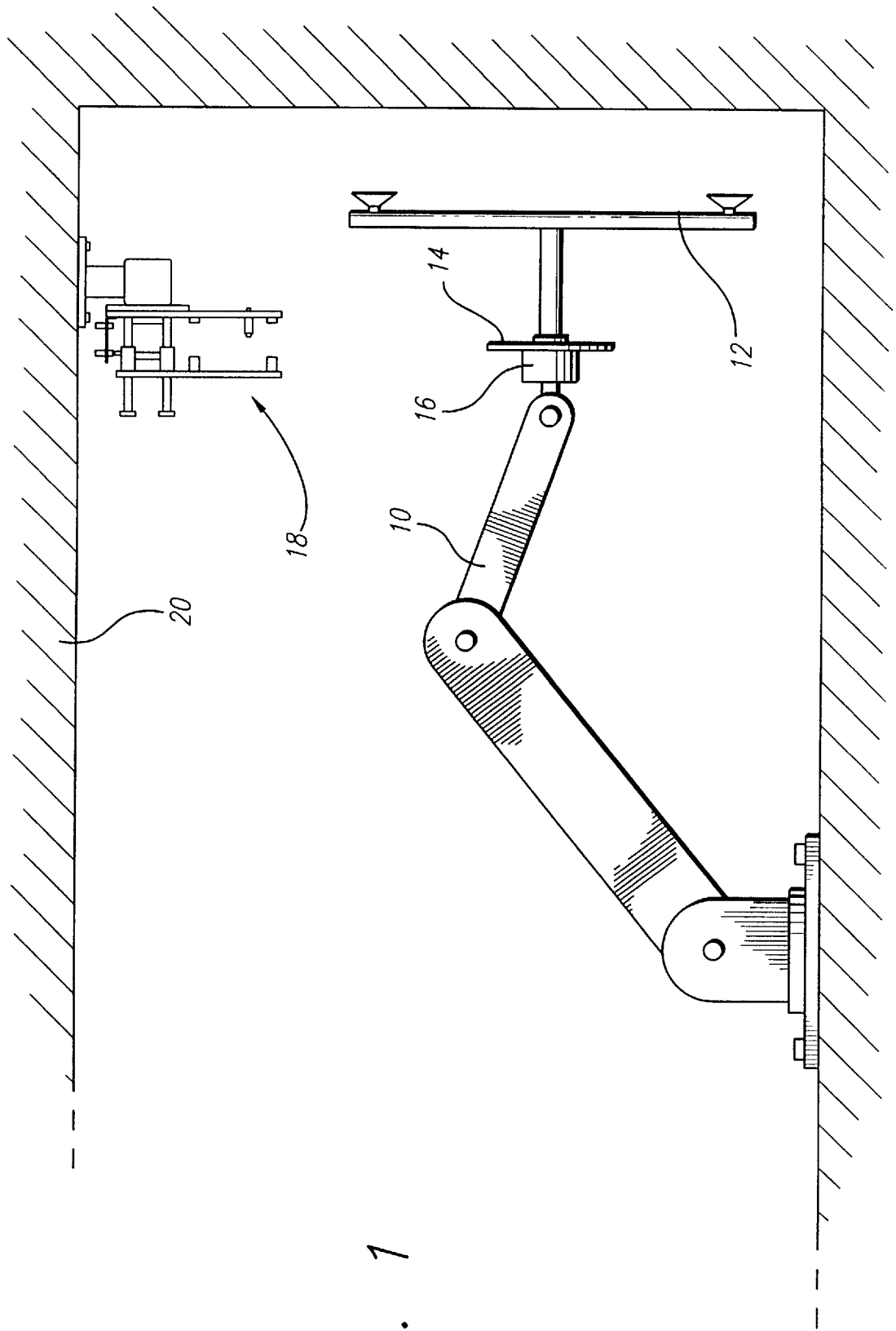
FIG. 1 is a perspective view of a manufacturing facility in which a new tool storage assembly according to the present invention is mounted above the floor of the manufacturing facility, thereby freeing valuable floor space for more productive use.

FIG. 1 illustrates a robot arm 10 that is engaged with and is carrying a tool 12. The tool 12 includes a tool disk 14 that connects with a coupling device 16 on the robot arm 10. One example of a robot arm that can be used with the present invention the Kawasaki UT150 shelf mount robot, although any of a variety of different types of robot arms may be used with the present invention. During a manufacturing operation, the robot arm 10 is able to move the tool 12 horizontally and vertically, and can rotate the tool to any desired orientation. The particular tool 12 is used in a process for stamping metal, but there are a wide variety of tools that can be used, depending on the type of operations the robot is performing at a given time.

When the robot arm is finished using the tool 12, it returns the tool to a tool rack 18 for storage. The rack 18 automatically closes once the robot arm has placed the tool onto the rack, thereby clamping the tool 12 in place. When the robot arm connects with a tool on the rack, the rack automatically opens so that the robot arm can remove the tool from the rack.

The tool rack 18 is mounted on an overhead support beam 20, such that the tool rack is off of the floor and out of the way of the manufacturing operation. The overhead support beam may be part of a special frame that is constructed to support the tool rack 18, or may be part of the ceiling itself. The robot arm 10 may alternatively be mounted on another off-the-floor structure, such as a side wall beam. In a few specialized applications, the tool rack 18 may even be mounted on a floor-based structure. However, it is preferred that the tool rack be mounted off of the floor so as to maximize the space available on the floor for manufacturing operations.

Figure 2:
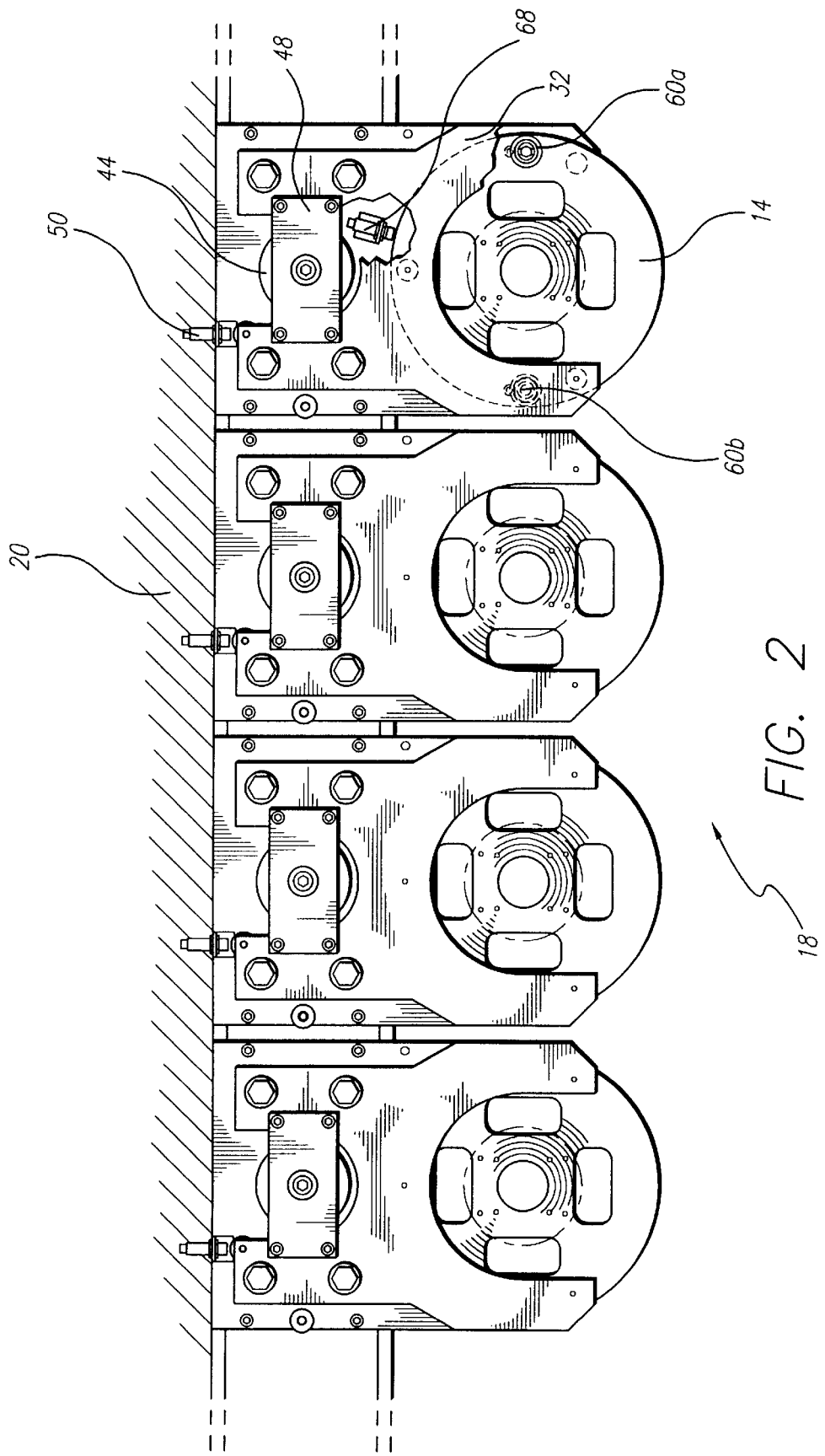
FIG. 2 is a front view of a preferred embodiment of a new tool storage assembly with tools stored thereon.
Figure 4:
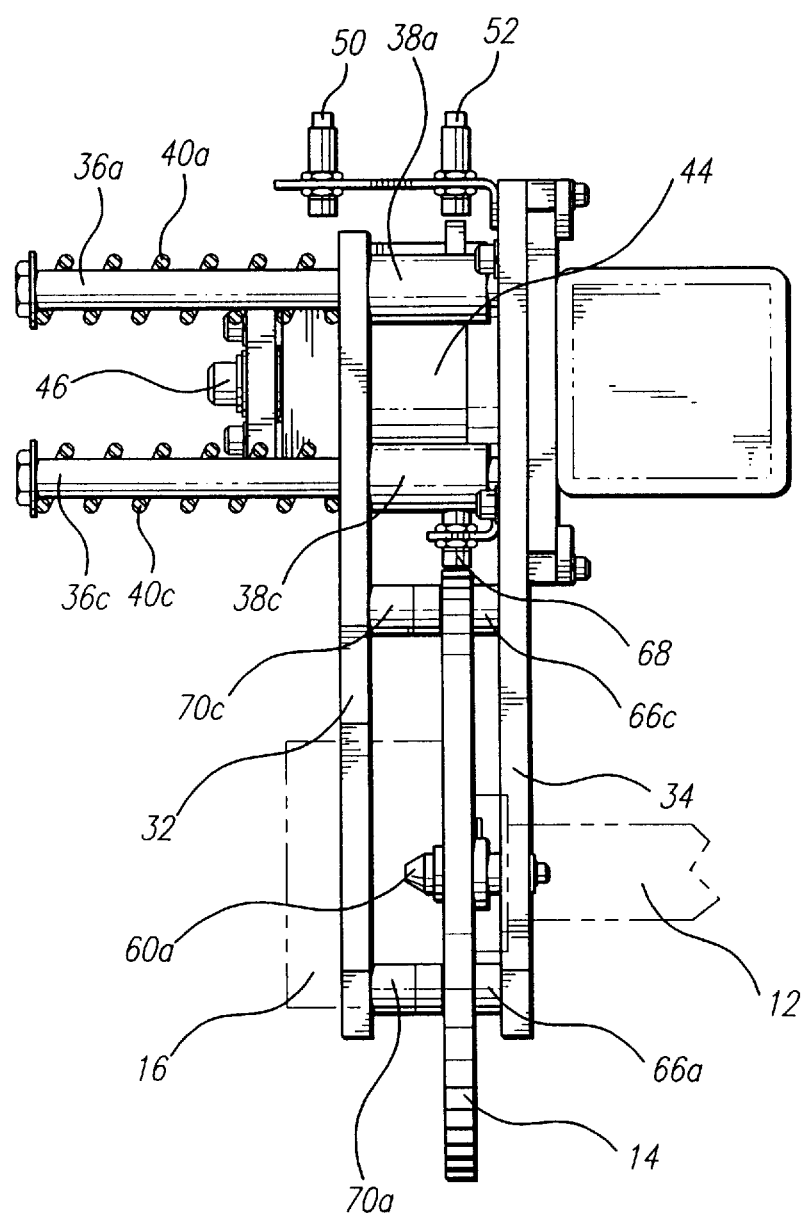
FIG. 4 is a side view of the tool storage assembly of FIG. 2 in a closed or clamped mode.

Considering now the rack in greater detail, the tool storage rack 18 is made up of individual units arranged in sequence on a support (FIG. 2). Each individual unit stores a single tool and opens and clamps shut independently of the others. Each unit has a pair of u-shaped jaws 32 and 34 (FIG. 4). The u-shaped jaws are open at the bottom to allow the robot arm to remove the tool downwardly off of the rack. The front u-shaped jaw 32 is mounted on drive rods 36a,b,c,d so that the jaw can slide back and forth on the rods. The front u-shaped jaw 32 is equipped with sleeve bushings 38a,b,c,d to facilitate smooth back-and-forth movement along the drive rods. Compression springs 40a,b,c,d are mounted at the ends of the respective drive rods 36a–d to bias the unshaped jaw 32 toward the unshaped jaw 34.

Figure 5:
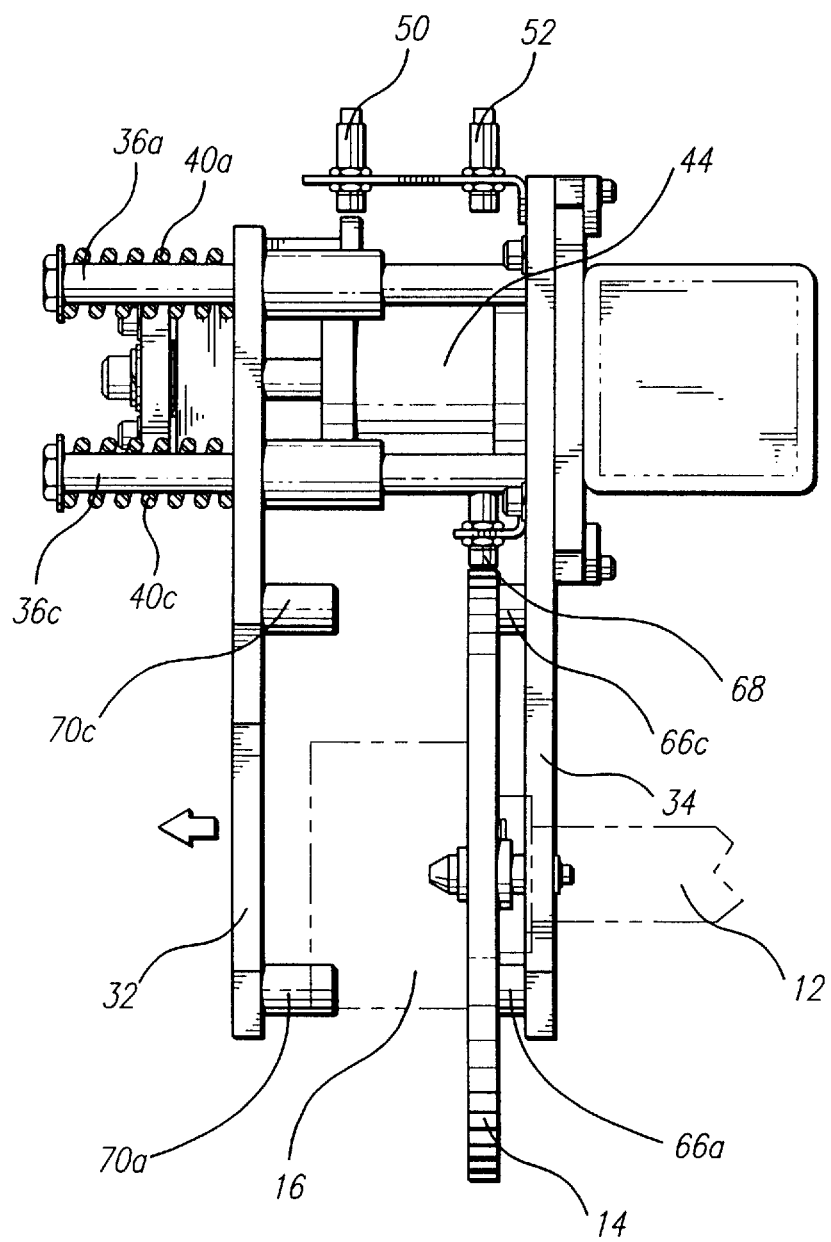
FIG. 5 is a side view of the tool storage assembly of FIG. 4 in an open or unclamped mode with a tool held in place on the assembly by tool pins.
Figure 6:
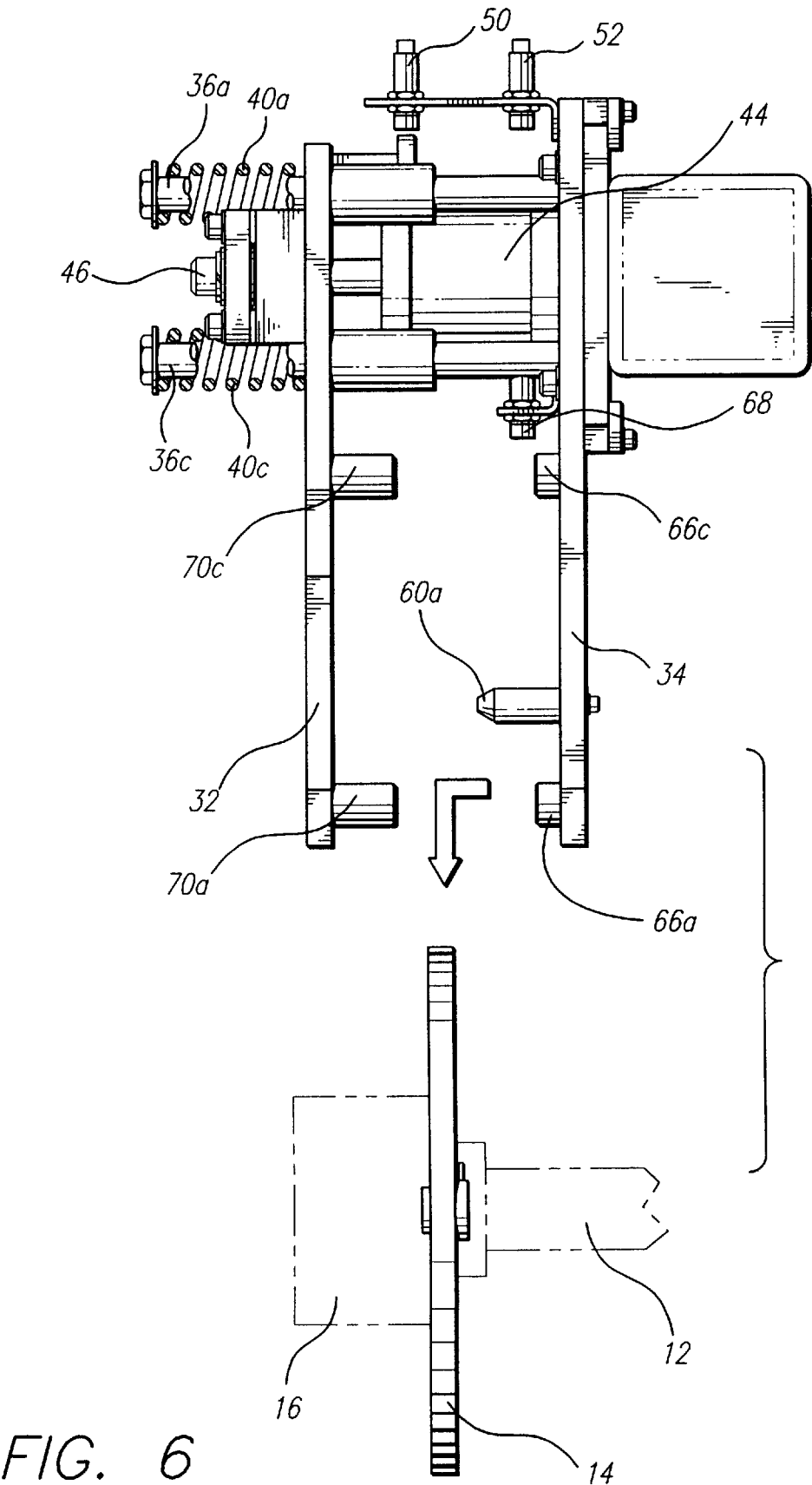
FIG. 6 is a side view of the tool storage assembly of FIG. 5 in an open or unclamped mode with the tool having been removed from the assembly.
Figure 7:
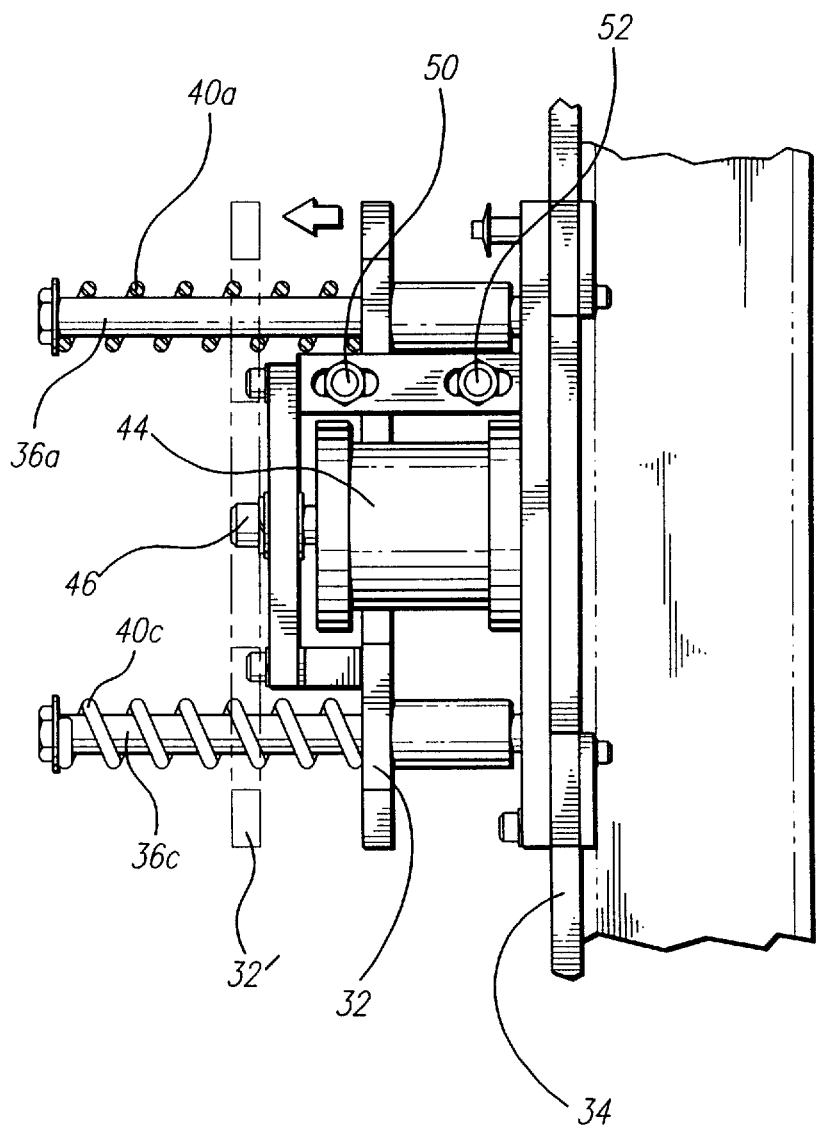
FIG. 7 is a top view of a single tool storage unit according to the present invention.

A pneumatic cylinder 44 has a rod 46 that is connected to a plate 48 attached to the front u-shaped jaw 32. When the air cylinder pushes the rod 46 outwardly, the front u-shaped jaw is forced to slide outwardly along the drive rods 36 a–d into an open position (FIG. 5). When the pneumatic cylinder subsequently pulls the rod 46 inwardly, the front u-shaped jaw 32 is retracted along the drive rods into a closed, clamped position (FIG. 4). Proximity switches 50 and 52 detect when the front jaw 32 is in the open and closed position, respectively.

Figure 3:
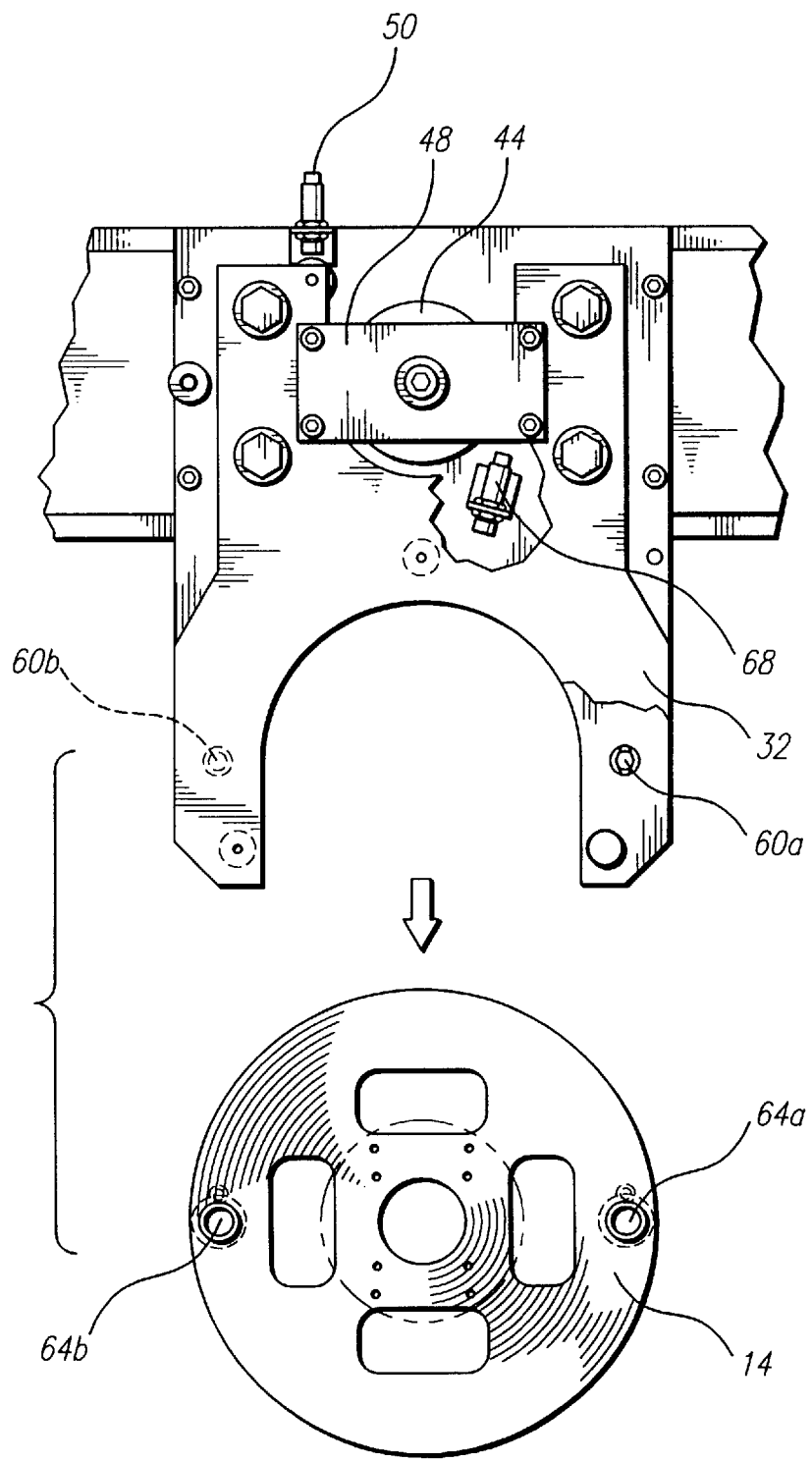
FIG. 3 is an exploded front view of a single tool storage unit and a tool removed therefrom.

The rack holds a tool in place with a pin/hole arrangement and clamping. Considering the pin/hole arrangement, FIG. 4 illustrates one tool pin 60a that extends forward from the rear u-shaped jaw 34. A companion tool pin 60b extends forward from the rear jaw 34 at a spaced distance from the tool pin 60a. FIG. 3 illustrates the relative positions of tool pins 60a and 60b in the assembly.

Each of the tools is provided with a tool disk 14 having two guide holes 64a and 64b (FIG. 3), which correspond to the tool pins 60a,b. To mount the tool onto the rack 30, the robot arm moves the tool disk 14 from beneath the rack, up through the space defined between the open jaws of the rack, and into alignment with the tool pins 60a,b. The robotic arm then moves the tool disk 14 laterally such that the tool pins 60a,b extend through the respective guide holes 64a,b and the tool disk rests against rest buttons 66a,b,c. FIG. 4 illustrates the rest buttons 66a,c and FIG. 2 illustrates the position of rest buttons 66a,b,c.

A tool sensor 68 senses when the robot arm has moved the tool disk 14 into place on the rack. The sensor sends a signal to a central control system (not shown), which injects air into the pneumatic cylinder 44 to cause the rod 46 to retract, thereby clamping the front jaw 32 shut against the tool disk 14 (FIG. 4). The front jaw 32 includes spacers 70a,b,c that come into contact with the tool disk 14 when the tool rack is in the closed position, thereby maintaining the front jaw 32 at a distance from the tool disk 14. Once the rack has closed about the tool disk, the robotic arm disengages from the tool disk and moves away from the rack.

When the robotic arm engages the tool disk 14 to remove the tool from the rack, the jaw 32 opens to release the tool in a similar fashion. The central control system causes air to be injected into the air cylinder 44, which forces the rod 46 outwardly and causes the jaw 32 to open. The robotic arm is then free to remove the tool from the rack.

The normal, biased mode of the tool rack is in the closed, clamped position of FIG. 4. The compression springs 40a,b,c,d force the u-shaped jaw 32 shut, unless the air cylinder 44 forces the jaw open. Additional means may be provided for maintaining the jaws in the closed mode, such as mechanical and/or electromechanical locking devices.

Considering now how the rack opens and shuts, the cylinder rod 46 has a plate 48 on the end attached to the front u-shaped jaw. The cylinder is pneumatic, and it has ports into which air is injected. As air is injected into one of the ports, the rod is driven outwardly from the cylinder, thereby opening the jaw. As air is injected into the other of the ports, the rod is driven inwardly toward the cylinder, thereby shutting the jaw. Of course, the cylinder need not be of the pneumatic variety but could alternatively be a hydraulic cylinder. Magnetic mechanisms for opening and closing the jaws could alternatively be used, as could other known mechanical open and closing means.

The jaw is considered to be closed when spacers are in contact with the tool disk. The preferred embodiment of the present invention includes proximity switches to sense whether the is open and shut. Sensors can also be provided to indicate when the robotic arm has grasped a tool, so that the jaw will open, and when the robotic arm has put a tool back on the rack, so that the jaw will shut.

Concerning dimensions of the present invention, the rack can be sized according to the type and size of the tools that are to be stored on the disk. Generally speaking, tools of various sizes can be stored on a particular rack, because the tool is provided with a standard-sized tool disk 14. Consequently, the tool can be various sizes, so long as a standard-sized tool disk is used that is compatible with the particular rack.

In one presently preferred embodiment, the u-shaped jaws are approximately 17" wide from one exterior side to the other exterior side. The interior of the "u" is approximately 11" wide. The rack is roughly 22 ½" long from tip of "u" to where the rack mounts onto the support. The tool disk is approximately 14" wide from the center of one guide hole to the center of the other guide hole. This particular embodiment is designed for securely storing and retrieving heavy tools in the range of 200–300 lbs.

In review, the present invention allows tools to be clamped into a storage rack within reach of a robot. The robot can move to the rack, drop off one tool, and pick up another. One use for the present invention is for sheet metal stamping operations. The robots transfer parts between stamping presses, and the robots require multiple tools to run multiple parts on the line.

A unique feature of the present invention is that the tools are stored up off of the floor, which leaves the floor area free for activities such as die change for the stamping presses. The robot, equipped with a tool changing coupling device, can move up and access the tool rack for dropping off the old tool and picking up the new tool, while leaving the floor below unobstructed for die change activities.

One component of the overall system is the tool disk 14. The tool disk 14 is the attachment point for the tool 12 being stored and retrieved. The coupling device 16 of the robot arm attaches to the tool disk 14. The tool disk also has typically two guide holes 64 a,b for positively locating the tool disk over the corresponding pins 60 a,b in the tool clamp. The tool disk 14 also provides the clamping surface onto which the tool clamp closes.

The tool clamp is an inverted, generally u-shaped clamp mechanism. The robot can move the tool/tool disk assembly into position in the rack through the open end of the u-shaped clamp. The robot moves the tool up into the clamp vertically, and then moves the tool disk 14 horizontally to engage the guide holes with the locating pins on the clamp. Once the tool disk 14 has been moved over the pins and against the rest points which contact the tool disk, the clamp is actuated via a pneumatic cylinder, and the tool disk 14 is clamped into place. The robot then disengages the automatic coupling device that connects the tool/tool disk assembly to the robot, and the robot moves away to pick up the next tool.

In the foregoing detailed description, preferred embodiments of the invention have been disclosed. However, various modifications and changes may be made without departing from the spirit and scope of the invention. Thus, the tool disk 14 may be a shape other than a disk. The air cylinder 44 may be replaced with a hydraulic cylinder, or with other mechanical or electromechanical opening and closing systems known in the art.

The presently preferred embodiment of the invention is mounted above the floor, on a support that extends parallel to the floor, so that the robotic arm can store and/or retrieve tools from beneath the rack. However, the rack can alternatively be mounted on a vertical support that is itself mounted to a side wall, for example. The rack is thereby kept off of the floor and does not take up valuable floor space. In such an arrangement, the rack extends vertically, and the tools are stored in columns. Whereas in the preferred embodiment, the robotic arm approaches the tool rack from beneath, in this alternative embodiment the arm would approach the rack from the side.

Because the rack closes shut against the corresponding tool disk, the rack securely stores the tool irrespective of the orientation of the rack. Consequently, the rack of the present invention can hold the tools vertically, horizontally or at any angle that suits the needs of a particular application.

The presently preferred embodiment also has one stationary jaw and one movable jaw. In an alternative embodiment, however, both jaws can be made movable, if desirable. More or fewer than two tool pins may be employed, and the spacers and/or rest buttons can be padded to protect the tool disk surface in special applications. It should also be noted that the jaws do not need to be perfectly "u"-shaped, so long as there are openings at the bottom of the respective jaws through which the robotic arm may move the tool. Rather than having a "u"-shape, a particular rack can have an upside-down "c" or other shape, including an irregular shape, depending on the type of tool that the rack is to hold.

Accordingly, the present invention is not limited precisely to the arrangements as shown in the drawings and as described in detail hereinabove.

What is claimed is:

1. A tool holding rack comprising:
    a plurality of tool-holding clamping units, each comprising a first jaw and a second jaw, at least said second jaw being open at the bottom, said second jaw being movable relative to said first jaw; and
    said tool-holding units being mounted in a horizontal array and being accessible from below for retrieving and storing tools on said tool storage units;
    wherein said tool-holding units have a clamped mode in which the unit is adapted to clamp a tool in place on the rack, and an open mode in which said first jaw is spaced from said second jaw such that said unit is adapted to permit removal of a tool from said rack; and
    wherein each of said tool-holding units includes at least one drive rod along which said second jaw moves relative to said first jaw.

2. A tool holding rack as defined in claim 1 wherein said rack includes a drive system to individually open and close said units.

3. A rack unit for storing and retrieving tools for a robotic arm, the tools each having a tool disk and a tool pin aperture:
    a first jaw and a second jaw, said jaws being open at bottom;
    at least one rod, said second jaw being movable along said rod relative to said first jaw;
    a drive mechanism that is attached to said second jaw and which is adapted to move said second jaw relative to said first jaw along said rod; and
    a tool pin extending from said first jaw toward said second jaw, said tool pin being adapted to extend through a tool pin aperture of one of the tools when the tool is mounted on the rack unit;
    a position detector that detects when a tool is mounted on said rack unit;
    at least one detector for determining when the rack unit is open and shut
    wherein said rack unit has a closed position for storing a tool on the rack unit in which said second jaw is relatively closer to said first jaw, and an open position for both mounting and removing a tool from the rack unit in which said second jaw is relatively farther from said first jaw, said rack unit being biased in the closed position.

4. A tool holding rack as defined in claim 1 wherein said tool holding units are biased toward said clamped mode.

5. A tool holding rack as defined in claim 1 wherein said rack is adapted to receive and store tools individually weighing at least approximately 100 pounds.

6. A tool holding rack as defined in claim 1 wherein each of said tool holding units further comprise a position detector that detects when a tool is mounted on the tool holding unit.

7. A tool holding rack as defined in claim 1 wherein each of said tool holding units further comprises at least one detector that senses when the unit is open and shut.

8. A tool holding rack as defined in claim 1 wherein each of said tool holding units comprise a pin extending from one of said jaws toward the other of said jaws, said tool pin being adapted to extend through a tool pin aperture of a tool when the tool is mounted on the rack unit.

9. A tool holding rack as defined in claim 1 wherein said first jaw is also open at the bottom.

10. A rack unit for storing and retrieving tools for a robotic arm, the tools each having a tool disk for engagement with the rack and at least one tool pin aperture on the tool disk:
    a first jaw and a second jaw, at least said second jaw being open at the bottom;
    at least one rod, said second jaw being movable along said rod relative to said first jaw;

a drive mechanism that is attached to said second jaw and which is adapted to move said second jaw relative to said first jaw along said rod; and a tool pin extending from said first jaw toward said second jaw, said tool pin being adapted to extend through a tool pin aperture of one of the tools when the tool is mounted on the rack unit;

wherein said rack unit has a closed position for clamping a tool onto the rack unit in which said second jaw is relatively closer to said first jaw, and an open position for both mounting and removing a tool from the rack unit in which said second jaw is relatively farther from said first jaw.

11. A rack unit as defined in claim 10 wherein said drive mechanism is selected from the group comprising pneumatic drives, hydraulic drives, motor-driven drives and magnetic drives.

12. A rack unit as defined in claim 10 wherein said second jaw is substantially u-shaped.

13. A rack unit as defined in claim 10 wherein said second jaw is biased in said closed position.

14. A rack unit as defined in claim 10 wherein said rack further comprises a position detector that detects when a tool is mounted on said rack.

15. A rack unit as defined in claim 14 wherein said position detector comprises at least one proximity switch.

16. A rack unit as defined in claim 10 wherein said rack unit further comprises at least one detector that senses when the rack unit is open and shut.

17. A rack unit as defined in claim 10 wherein said rack unit is adapted to receive and store tools weighing at least approximately 100 pounds.

18. A manufacturing system utilizing a robotic arm, a rack, and a plurality of tools, the tools each having a tool disk for engagement with the rack and at least one tool pin aperture on the tool disk, the system comprising:

a rack unit comprising:
 a first jaw and a second jaw, at least said second jaw being open at the bottom;
 at least one rod, said second jaw being movable along said rod relative to said first jaw;
 a drive mechanism that is attached to said second jaw and which is adapted to move said second jaw relative to said first jaw along said rod; and
 a tool pin extending from one of said jaws toward the other of said jaws, said tool pin being adapted to extend through a tool pin aperture of one of the tools when the tool is mounted on the rack unit;
 wherein said rack unit has a closed position for clamping a tool onto the rack unit in which said second jaw is relatively closer to said first jaw, and an open position for both mounting and removing a tool from the rack unit in which said second jaw is relatively farther from said first jaw;
a tool stored on said rack unit;
a robotic arm adapted to reach said tools stored on said rack units from beneath; and
a workspace having a floor, said rack unit being mounted above and off of said workspace floor on a support structure, said first and second jaws extending downwardly toward the floor, said tool pin being adapted to prevent said tool from falling to the floor when said rack is in the open position and said tool is mounted on said rack.

19. A tool holding rack comprising:

a plurality of tool-holding clamping units, each comprising a first jaw and a second jaw, at least said second jaw being open at the bottom, said second jaw being movable relative to said first jaw; and said tool-holding units being mounted in a horizontal array and being accessible from below for retrieving and storing tools on said tool storage units;

wherein said tool-holding units have a clamped mode in which the unit is adapted to clamp a tool in place on the rack, and an open mode in which said first jaw is spaced from said second jaw such that said unit is adapted to permit removal of a tool from said rack; and wherein each of said tool holding units comprise a pin extending from said first jaw toward said second jaw, said tool pin being adapted to extend through a tool pin aperture of a tool when the tool is mounted on the rack unit.

20. A tool holding rack as defined in claim 19 wherein each of said tool holding units further comprises at least one detector that senses when the unit is open and shut.

21. A tool holding rack as defined in claim 19 wherein said first jaw is also open at the bottom.

22. A tool holding rack as defined in claim 19 wherein said rack includes a drive system to individually open and close said units.

23. A tool holding rack as defined in claim 19 wherein each of said tool-holding units includes at least one drive rod along which said second jaw moves relative to said first jaw.

24. A tool holding rack as defined in claim 19 wherein said tool holding units are biased toward said clamped mode.

25. A tool holding rack as defined in claim 19 wherein said rack is adapted to receive and store tools individually weighing at least approximately 100 pounds.

26. A tool holding rack as defined in claim 19 wherein each of said tool holding units further comprise a position detector that detects when a tool is mounted on the tool holding unit.

27. A tool holding rack comprising:

a plurality of tool-holding clamping units, each comprising a first jaw and a second jaw, at least said second jaw being open at the bottom, said second jaw being movable relative to said first jaw; and said tool-holding units being mounted in a horizontal array and being accessible from below for retrieving and storing tools on said tool storage units;

wherein said tool-holding units have a clamped mode in which the unit is adapted to clamp a tool in place on the rack, and an open mode in which said first jaw is spaced from said second jaw such that said unit is adapted to permit removal of a tool from said rack; and wherein each of said tool-holding units includes at least one drive rod along which said second jaw moves relative to said first jaw, and wherein the tool storage rack is adapted to be mounted above a floor to provide a free work space beneath the rack, such that a robotic arm can approach and engage the tool from beneath the rack, the rack being adapted to automatically open so that the robotic arm can remove the tool and then subsequently replace the tool onto the rack, the rack being adapted to automatically close to store the tool thereafter.

* * * * *